US012300143B2

(12) United States Patent
He

(10) Patent No.: US 12,300,143 B2
(45) Date of Patent: May 13, 2025

(54) METHODS OF COMPENSATING FOR DATA OF A DISPLAY PANEL AND DISPLAY DEVICES

(71) Applicant: Shenzhen China Star Optoelectronics Semiconductor Display Technology Co., Ltd., Guangdong (CN)

(72) Inventor: Jhenwei He, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 41 days.

(21) Appl. No.: 18/326,376

(22) Filed: May 31, 2023

(65) Prior Publication Data

US 2024/0346976 A1 Oct. 17, 2024

(30) Foreign Application Priority Data

Apr. 12, 2023 (CN) ........................ 202310439972.X

(51) Int. Cl.
*G09G 3/20* (2006.01)

(52) U.S. Cl.
CPC ..... *G09G 3/2018* (2013.01); *G09G 2310/027* (2013.01); *G09G 2320/028* (2013.01); *G09G 2320/0666* (2013.01); *G09G 2320/068* (2013.01)

(58) Field of Classification Search
CPC .................................................... G09G 3/2018
See application file for complete search history.

(56) References Cited

U.S. PATENT DOCUMENTS

2022/0392390 A1* 12/2022 Lee ...................... G09G 3/3614

FOREIGN PATENT DOCUMENTS

CN 115223511 A * 10/2022 ............... G09G 3/36
KR 20180009153 A * 1/2018 ........... G09G 3/2074

* cited by examiner

*Primary Examiner* — Nelson M Rosario
*Assistant Examiner* — Scott D Au
(74) *Attorney, Agent, or Firm* — PV IP PC; Wei Te Chung

(57) ABSTRACT

A method of compensating for data of a display panel includes: obtaining display data of an image to be displayed; determining a viewing angle improvement rate for improving viewing angle of the display panel based on the display data; obtaining a target compensation table for compensating the display panel by a preset compensation algorithm based on the viewing angle improvement rate; and compensating for the display data based on the target compensation table.

19 Claims, 5 Drawing Sheets

METHODS OF COMPENSATING FOR DATA OF A DISPLAY PANEL AND DISPLAY DEVICES

CROSS-REFERENCE TO RELATED APPLICATION

This application claims priority to and the benefit of Chinese Patent Application No. 202310439972. X filed on Apr. 12, 2023, the disclosure of which is incorporated herein by reference in its entirety.

TECHNICAL FIELD

The present disclosure relates to display technologies, in particular to methods of compensating for data of a display panel and display devices.

BACKGROUND

With development of display technology, resolution of display panels is also gradually improved. The resolution of the display panels has reached above 8K (7680*4320). For a display panel, an improved resolution with its size unchanged may result in reduction in an aperture ratio, thereby reducing the transmittance of the display panel. Therefore, 8-Domain pixel architecture originally used to improve viewing angle characteristics cannot be applied to higher-resolution products due to the loss of penetration rate, and it is replaced by 4-Domain pixel architecture. However, the 4-Domain pixel architecture has led to deterioration of viewing angle characteristics, and it is necessary to improve the viewing angle characteristics through a viewing angle improvement algorithm.

There is a viewing angle improvement algorithm, in which sub-pixels in an effective display area of the display panel are distinguished by two different states of a high gray-scale H and a low gray-scale L and the degree of brightness change when viewed from a side may be reduced by setting the sub-pixels to be in the low gray-scale L. However, when the viewing angle improvement algorithm is enabled, it is inevitable to produce a graininess. Therefore, in order to avoid losing image quality, the viewing angle improvement algorithm will be appropriately disabled when displaying special images to improve image quality. That is, the viewing angle of the display panel may be improved at different viewing angle improvement rates for different images to be displayed.

However, due to the single path of compensation for the display data, compensation algorithms other than the viewing angle improvement algorithm are generally debugged when the viewing angle improvement algorithm is fully enabled. If a viewing angle improvement rate is changed, incorrect corresponding gray-scales will be generated and thus a debugging effect of display image quality will deteriorate.

SUMMARY

In view of the above, an embodiment of the present disclosure provides a method of compensating for data of a display panel, including:

- obtaining display data of an image to be displayed on the display panel;
- determining a viewing angle improvement rate for improving a viewing angle of the display panel based on the display data;

- obtaining a target compensation table for compensating the display panel by a preset compensation algorithm based on the viewing angle improvement rate; and
- compensating for the display data based on the target compensation table.

In addition, another embodiment of the present disclosure provides a display device, including a display panel and a time control register, wherein the display device compensates for display data of the display panel adopting the method of compensating for data of the display panel as defined in any of the above, and the time control register is at least configured to obtain the display data.

DETAILED DESCRIPTION

Some embodiments of the present disclosure will be described in detail below in conjunction with the drawings. The embodiments are described for illustration only, but not intended to limit the present disclosure.

In the description of the present application, it should be understood that, the terms “first” and “second” are only used for descriptive purposes and cannot be understood as indicating or implying relative importance or implicitly indicating the number of indicated technical features. Thus, the features defining “first” and “second” may explicitly or implicitly include one or more of the features. In addition, the term “a plurality of” refers to two or more.

The present disclosure provides a data compensation method and display device for a display panel, which will be explained in detail below. It should be noted that the description order of the following embodiments does not limit the preferred order of the embodiments in the present disclosure.

The method of compensating for data of a display panel according to one or more embodiments of the present disclosure includes the following operations: first, obtaining display data of an image to be displayed on the display panel. Then, determining a viewing angle improvement rate for improving a viewing angle of the display panel based on the display data. Next, obtaining a target compensation table for compensating the display panel by a preset compensation algorithm based on the viewing angle improvement rate. Finally, compensating for the display data based on the target compensation table.

The viewing angle improvement rate refers to a degree to which the viewing angle improvement algorithm is activated for a plurality of sub-pixels corresponding to the image to be displayed. That is, a ratio of sub-pixels with the viewing angle improvement algorithm enabled to total sub-pixels in the image to be displayed.

The preset compensation algorithm can be a compensation algorithm closely related to the viewing angle improvement algorithm. That is, when the viewing angle improvement rate of the viewing angle improvement algorithm changes, a compensation effect of the preset compensation algorithm will be affected. For example, the preset compensation algorithm can be any of a white balance adjustment algorithm, a brightness compensation algorithm, or a gamma adjustment algorithm. The preset compensation algorithm can be performed before or after the viewing angle improvement algorithm, and the present disclosure does not specify any specific limitations.

Specifically, the following embodiments of the present disclosure are described by taking the preset compensation algorithm as the white balance adjustment algorithm as an example, but it cannot be understood as a limitation of the present disclosure.

Figure 1:
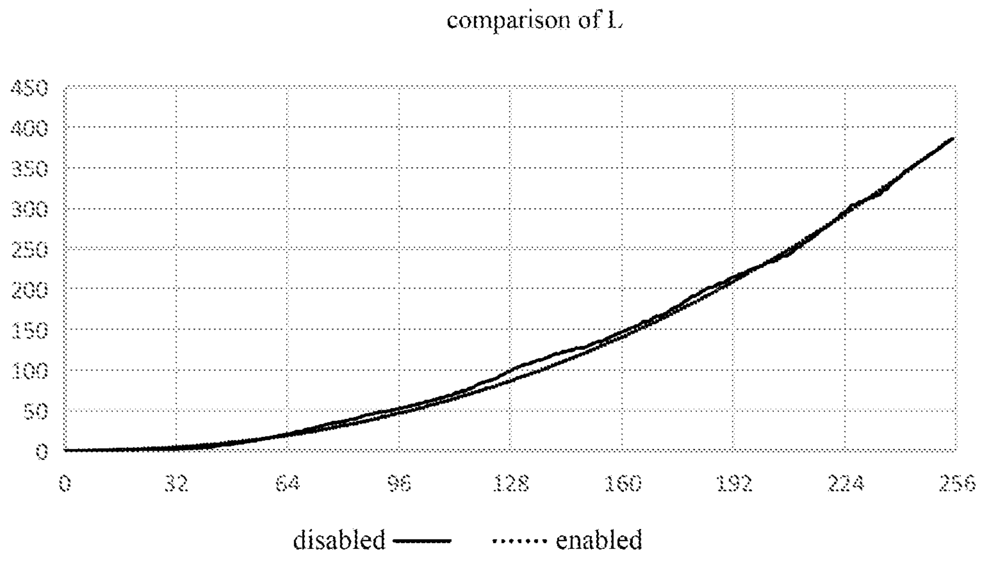
FIG. 1 is a schematic diagram of respective gamma curves when a viewing angle improvement algorithm is enabled and when the viewing angle improvement algorithm is disabled.
Figure 2:
FIG. 2 is a schematic diagram of respective relationships between X stimulus value and gray-scale when the viewing angle improvement algorithm is enabled and when the viewing angle improvement algorithm is disabled.
Figure 3:
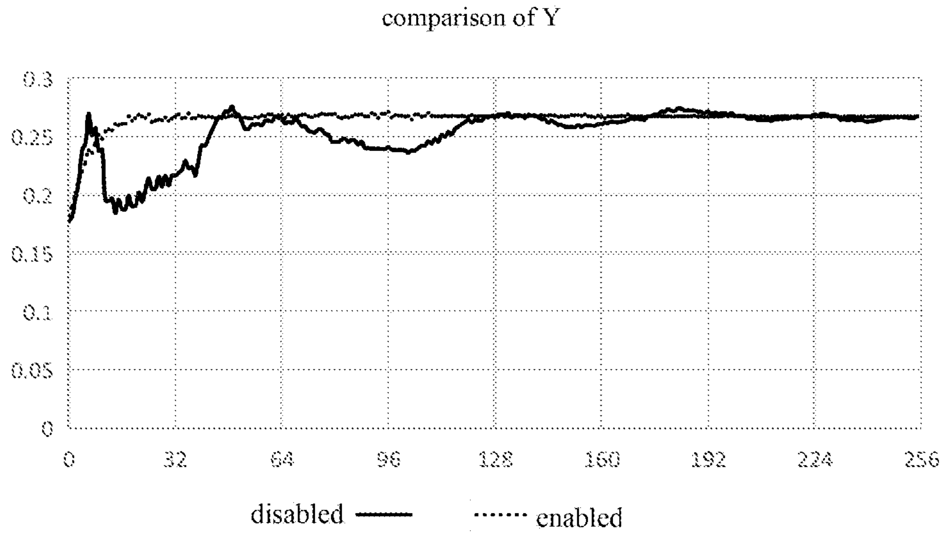
FIG. 3 is a schematic diagram of respective relationships between Y stimulus value and the gray-scale when the viewing angle improvement algorithm is enabled and when the viewing angle improvement algorithm is disabled.

Please refer to FIGS. 1 to 3. FIG. 1 is a schematic diagram of respective gamma curves when a viewing angle improvement algorithm is enabled and when the viewing angle improvement algorithm is disabled. FIG. 2 is a schematic diagram of respective relationships between X stimulus value and gray-scale when the viewing angle improvement algorithm is enabled and when the viewing angle improvement algorithm is disabled. FIG. 3 is a schematic diagram of respective relationships between Y stimulus value and the gray-scale when the viewing angle improvement algorithm is enabled and when the viewing angle improvement algorithm is disabled.

As shown in FIG. 1, a dashed line represents a relationship between different gray-scales and brightness when the viewing angle improvement algorithm is enabled. A solid line represents a relationship between the different gray-scales and brightness when the viewing angle improvement algorithm is disabled. It can be seen that for the white balance adjustment algorithm, when only one compensation table is used, the viewing angle improvement algorithm turns on and off to produce different display data values, so that the gamma curve of the display panel is discontinuous.

As shown in FIG. 2, a dashed line represents a relationship between X stimulus value and the gray-scale when the viewing angle improvement algorithm is enabled. A solid line represents a relationship between the X stimulus value and the gray-scale when the viewing angle improvement algorithm is disabled. As shown in FIG. 3, a dashed line represents a relationship between Y stimulus value and the gray-scale when the viewing angle improvement algorithm is enabled. A solid line represents a relationship between the Y stimulus value and the gray-scale when the viewing angle improvement algorithm is disabled. It can be seen that for the white balance adjustment algorithm, in the case of using only one compensation table, when the viewing angle improvement algorithm is enabled and off, both the X stimulus value and the Y stimulus value change, resulting in inconsistent chromaticity and affecting the display quality.

In embodiments of the present disclosure, when adopting the preset compensation algorithm to compensate for the display panel, different target compensation tables can be obtained based on different viewing angle improvement rates, avoiding incorrect corresponding gray-scales between the viewing angle improvement algorithm and the preset compensation algorithm. Therefore, when the viewing angle improvement rate is switched, the debugging effect of image quality improvement is automatically compensated for so as to maintain good image quality.

Details are given below.

Figure 4:
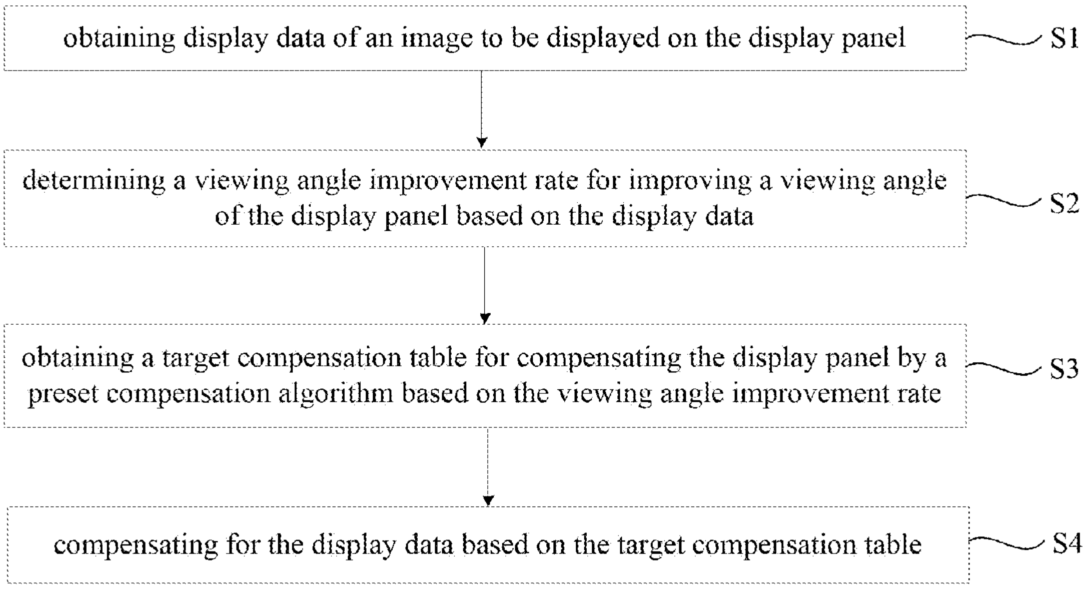
FIG. 4 is a schematic flowchart of a method of compensating for data of a display panel according to an embodiment of the present disclosure.

Please refer to FIG. 4, FIG. 4 is a schematic flowchart of a method of compensating for data of a display panel according to an embodiment of the present disclosure. As shown in FIG. 4, a method of compensating for data of a display panel may include operations S1~S4.

At operation S1, display data of an image to be displayed is obtained.

The display data includes the gray-scale values that each sub-pixel in the display panel needs to display in the image to be displayed. Specifically, a system on a chip can output image data to a time control register (TCON). The time control register analyzes the image data to obtain the display data of each frame of the display panel.

At operation S2, a viewing angle improvement rate for improving a viewing angle of the display panel based on the display data is determined.

When the viewing angle improvement algorithm is enabled, it will produce a graininess. Therefore, in order to avoid losing image quality, the viewing angle improvement algorithm will be appropriately disabled when unnecessary images such as text, high-frequency edges of images, and images that are less prone to large view character deviation, such as green spaces, are used to improve image quality. Therefore, different viewing angle improvement rates corresponding to different images to be displayed may be different.

Figure 5:
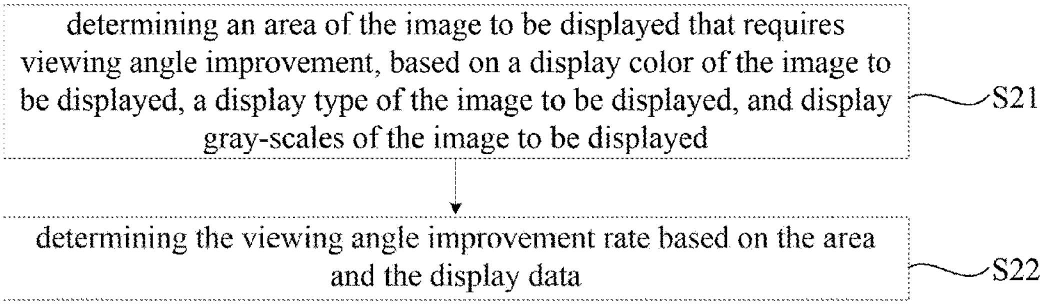
FIG. 5 is a schematic flowchart of operation S2 in FIG. 4 according to an embodiment of the present disclosure.

Specifically, please refer to FIG. 5. In an embodiment of the present disclosure, the operation S2 may be implemented by operations S21~S22.

At operation S21, an area of the image to be displayed that requires viewing angle improvement is determined, based on a display color of the image to be displayed, a display type of the image to be displayed, and display gray-scales of the image to be displayed.

The display color can be at least one of green, yellow, blue, red, white, etc. The display type can be text, picture, etc. For example, with an image display data of 8 bits, the display gray-scales can be at least one of 0-255 gray-scales.

For example, when the display type of the image to be displayed is text, due to the need to maintain sharpness in the text image for easy reading, and low requirement for color deviation during text reading, the viewing angle improvement algorithm can be completely disabled to improve image quality. At this time, the viewing angle improvement rate is 0%. For example, when displaying images such as green spaces, the viewing angle improvement algorithm can be appropriately disabled, and the viewing angle improvement rate is between 0%-100%. For example, when a skin color image is displayed and the viewing angle improvement algorithm is fully enabled, the viewing angle improvement rate is 100%. For example, in order to further improve color deviation, under different display gray-scale relationships of red sub-pixels, green sub-pixels, and blue sub-pixels, the viewing angle improvement algorithm can be disabled corresponding to at least one of the red sub-pixels, the green sub-pixels, and the blue sub-pixels.

In addition, different areas of the image to be displayed may display different images, so an area in the image to be displayed that requires viewing angle improvement based on the display color, the display type, and the display gray-scales of the image to be displayed.

At operation S22, the viewing angle improvement rate based on the area and the display data is determined.

After the area in the image to be displayed that requires viewing angle improvement is determined, a number of the sub-pixels in the area that requires viewing angle improvement can be determined, and then a degree to which the plurality of sub-pixels corresponding to the image to be displayed need to activate the viewing angle improvement algorithm can be determined, that is, the viewing angle improvement rate can be determined.

At operation S3, a target compensation table for compensating the display panel by a preset compensation algorithm based on the viewing angle improvement rate is obtained.

Figure 6:
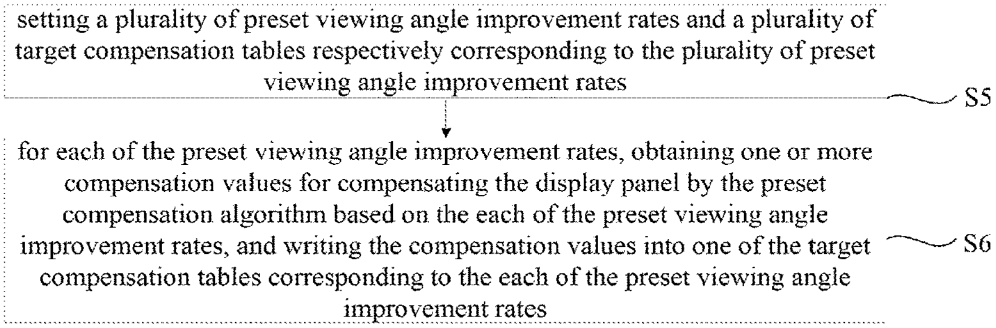
FIG. 6 is a schematic flowchart of some operations prior to operation S3 in FIG. 4 according to an embodiment of the present disclosure.

Specifically, please refer to FIG. 6. In an embodiment of the present disclosure, the method of compensating for data of the display panel my further includes operations S5~S6 before operation S3.

At operation S5, a plurality of preset viewing angle improvement rates and a plurality of target compensation tables respectively corresponding to the plurality of preset viewing angle improvement rates are set.

Specifically, the preset viewing angle improvement rate can be 0%, 10%, 20%, 30%, 40%, 50%, 60%, 70%, 80%, 90%, 100%, etc., which can be set according to an actual needs of the display panel. The plurality of target compensation tables can be stored in the time control register.

At operation S6, for each of the preset viewing angle improvement rates, one or more compensation values for compensating the display panel by the preset compensation algorithm based on the each of the preset viewing angle improvement rates are obtained, and the compensation values are wrote into one of the target compensation tables corresponding to the each of the preset viewing angle improvement rates.

Specifically, the viewing angle compensation tables corresponding to the viewing angle improvement algorithm may be obtained based on each of the preset viewing angle improvement rates. Then, the gray-scales may be adjusted according to the viewing angle compensation table to obtain the target compensation values when adopting the preset compensation algorithm to compensate the display panel, in order to avoid incorrect corresponding gray-scales between the viewing angle improvement algorithm and the preset compensation algorithm. Then, the target compensation values corresponding to the preset viewing angle improvement rates may be written into the corresponding target compensation table.

Furthermore, each target compensation table has a designated location and a designated transmission path. Regarding this, the operation S3 may be implemented by operations S31~S32.

At operation S31, one of the preset viewing angle improvement rates corresponding to the viewing angle improvement rate is determined.

At operation S32, the display data is transmitted to the designated position according to the designated transmission path based on the one of the preset viewing angle improvement rates, so as to obtain a corresponding one of the target compensation tables.

Specifically, if the viewing angle improvement rate is same as one of the plurality of preset viewing angle improvement rates, the target compensation table corresponding to the preset viewing angle improvement rate can be directly determined as the target compensation table corresponding to the viewing angle improvement rate.

If the viewing angle improvement rate is different from each of the plurality of preset viewing angle improvement rates, the target compensation table corresponding to the preset viewing angle improvement rate with a minimum difference in viewing angle improvement rate is selected as the target compensation table corresponding to the viewing angle improvement rate. For example, if the viewing angle improvement rate is 8%, the target compensation table corresponding to a preset viewing angle improvement rate of 10% can be selected as the target compensation table corresponding to the viewing angle improvement rate of 8%.

It can be understood that since each target compensation table has a designated location and a designated transmission path, the closest preset viewing angle improvement rate can only be selected based on the viewing angle improvement rate to improve compensation accuracy.

In addition, due to the one-to-one correspondence between the preset viewing angle improvement rates and the target compensation tables, when the preset viewing angle improvement rate is determined, the designated transmission path corresponding to the target compensation table can be obtained based on the preset viewing angle improvement rate, and then the display data can be transmitted to the designated location according to the designated transmission path.

In another embodiment of the present disclosure, the plurality of target compensation tables are all stored in a memory. Regarding this, the operation S3 may be implemented by operations S33~S34.

At operation S33, one or more of the preset viewing angle improvement rates corresponding to the viewing angle improvement rate is determined.

At operation S34 one or more of the compensation tables respectively corresponding to the one or more of the preset viewing angle improvement rates is called from the memory to obtain the target compensation table.

Specifically, if the viewing angle improvement rate is same as one of the plurality of preset viewing angle improvement rates, the target compensation table corresponding to the preset viewing angle improvement rate can be directly determined as the target compensation table corresponding to the viewing angle improvement rate.

If the viewing angle improvement rate is different from each of the plurality of preset viewing angle improvement rates, selecting two of the preset viewing angle improvement rates approximate to the viewing angle improvement rate, and obtaining a target compensation table corresponding to the viewing angle improvement rate by interpolating the target compensation tables corresponding to the two of the preset viewing angle improvement rates.

It can be understood that since the target compensation tables can be called from the memory, two target compensation tables can be called at a same time, and the two target compensation tables can be interpolated to obtain a new target compensation table. Therefore, a data storage space can be saved, and the compensation precision can be improved.

It should be noted that in the embodiments of the present disclosure, the operation S4, the operation S5, and the operation S6 can be located between the operation S2 and the operation S3, between the operation S1 and the operation S2, or before the operation S1. The present disclosure does not specify this.

Figure 7:
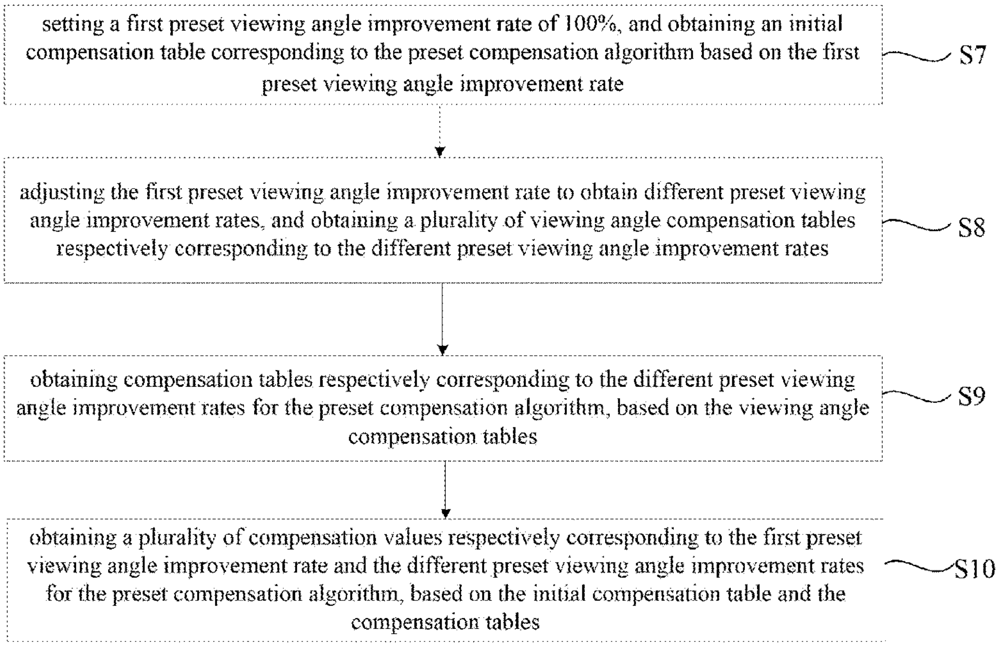
FIG. 7 is a schematic flowchart of some operations prior to operation S3 in FIG. 4 according to another embodiment of the present disclosure.

Please refer to FIG. 7. In an embodiment of the present disclosure, the method of compensating for data of the display panel may further includes operations S7~S10 before the operation S3.

At operation S7, a first preset viewing angle improvement rate of 100% is set, and an initial compensation table corresponding to the preset compensation algorithm is obtained based on the first preset viewing angle improvement rate.

Specifically, the viewing angle compensation table corresponding to the viewing angle improvement algorithm can be obtained based on a first preset viewing angle improvement rate of 100%. Then adjust the gray-scales based on the viewing angle compensation table to obtain the initial compensation table when compensating the display panel using the preset compensation algorithm.

At operation S8, the first preset viewing angle improvement rate is adjusted to obtain different preset viewing angle improvement rates, and a plurality of viewing angle compensation tables respectively corresponding to the different preset viewing angle improvement rates is obtained.

For example, the first preset viewing angle improvement rate may be adjusted to 0%, 25%, 75%, etc. to obtain the viewing angle compensation tables corresponding to the viewing angle improvement algorithm.

At operation S9, compensation tables respectively corresponding to the different preset viewing angle improvement rates for the preset compensation algorithm are obtained, based on the viewing angle compensation tables.

Specifically, the gray-scales are adjusted based on the viewing angle compensation table corresponding to different preset viewing angle improvement rates, to obtain the compensation tables for compensating the display panel using the preset compensation algorithm.

At operation S10, a plurality of compensation values respectively corresponding to the first preset viewing angle improvement rate and the different preset viewing angle improvement rates for the preset compensation algorithm are obtained, based on the initial compensation table and the compensation tables.

Specifically, each compensation table can be processed separately from the initial compensation table to obtain corresponding compensation values. Then store the compensation values in the memory for subsequent operation calls.

Regarding this, the operation S3 may be implemented by operations S35~S37

At operation S35, one preset viewing angle improvement value of the first preset viewing angle improvement value and the different preset viewing angle improvement rates corresponding to the viewing angle improvement rate is obtained.

At operation S36, one of the compensation values corresponding to the one preset viewing angle improvement value is determined.

If the viewing angle improvement rate is same as one of the plurality of preset viewing angle improvement rates, the compensation values corresponding to the preset viewing angle improvement rate can be directly determined as the compensation value corresponding to the viewing angle improvement rate.

If the viewing angle improvement rate is different from each of the plurality of preset viewing angle improvement rates, selecting two of the preset viewing angle improvement rates approximate to the viewing angle improvement rate, and obtaining compensation values corresponding to the viewing angle improvement rate by interpolating the compensation values corresponding to the two of the preset viewing angle improvement rates.

At operation S37, the one of the compensation values with the initial compensation table is superimposed to obtain the target compensation table.

Specifically, the compensation values are added to the initial compensation table to obtain the target compensation table.

It should be noted that in the embodiments of the present disclosure, operations S7, S8, S9, and S10 can be located between the operation S2 and the operation S3, between the operation S1 and the operation S2, or before the operation S1. The present disclosure does not specify this.

At operation S4, the display data is compensated based on the target compensation table.

Specifically, the target compensation table includes the compensation values corresponding to each gray-scale value. The corresponding gray-scale values in the display data can be compensated based on the compensation values in the target compensation table.

In an embodiment of the present disclosure, the method of compensating for data of the display panel further includes: before or after the operation of compensating for the display data based on the target compensation table, adopting a viewing angle improvement algorithm to improve a viewing angle of the display data based on the viewing angle improvement rate.

Specifically, the present disclosure illustrates the path of compensation for data of the display panel through specific embodiments.

Figure 8:
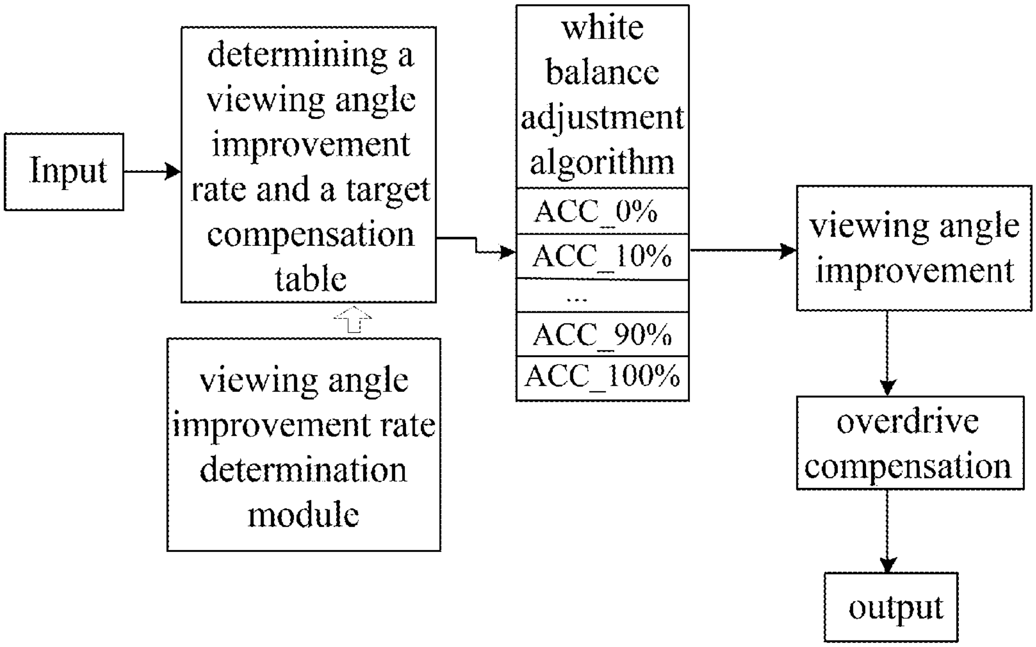
FIG. 8 is a schematic diagram of a first path of compensation for data of the display panel according to an embodiment of the present disclosure.

Please refer to FIG. 8, FIG. 8 is a schematic diagram of a first path of compensation for data of the display panel according to an embodiment of the present disclosure. As shown in FIG. 8, when the display data of the image to be displayed are input into the time control register, the time control register can determine the viewing angle improvement rate through a viewing angle improvement rate determination module, and determine the target compensation table based on the viewing angle improvement rate. Then, the display data are transmitted to the designated location along the designated transmission path to obtain the corresponding target compensation table, and the white balance compensation is performed on the display data based on the target compensation table. For example, if the viewing angle improvement rate is 10%, the display data are transmitted to the designated location where ACC_10% (corresponding to the target compensation table with a preset viewing angle improvement rate of 10%) is stored according to the designated transmission path.

Then, based on the viewing angle improvement rate, the viewing angle improvement algorithm is used to improve the viewing angle of the display data after the white balance compensation. Next, overdrive compensation for the display data after the viewing angle has been improved is performed. Since the switching of the viewing angle improvement rate does not affect the overdrive compensation, no additional processing is required for the compensation table of the overdrive compensation. Finally, the display data that have been compensated by a series of algorithms will be output.

The viewing angle improvement rate determination module includes processing modules such as SCS, Edge, and CSI. Based on this, the viewing angle improvement rate determination module can determine the viewing angle improvement rate based on the display color, the display type, and the display gray-scale of the image to be displayed. Please refer to the above embodiments for details, and we will not elaborate on them here.

Figure 9:
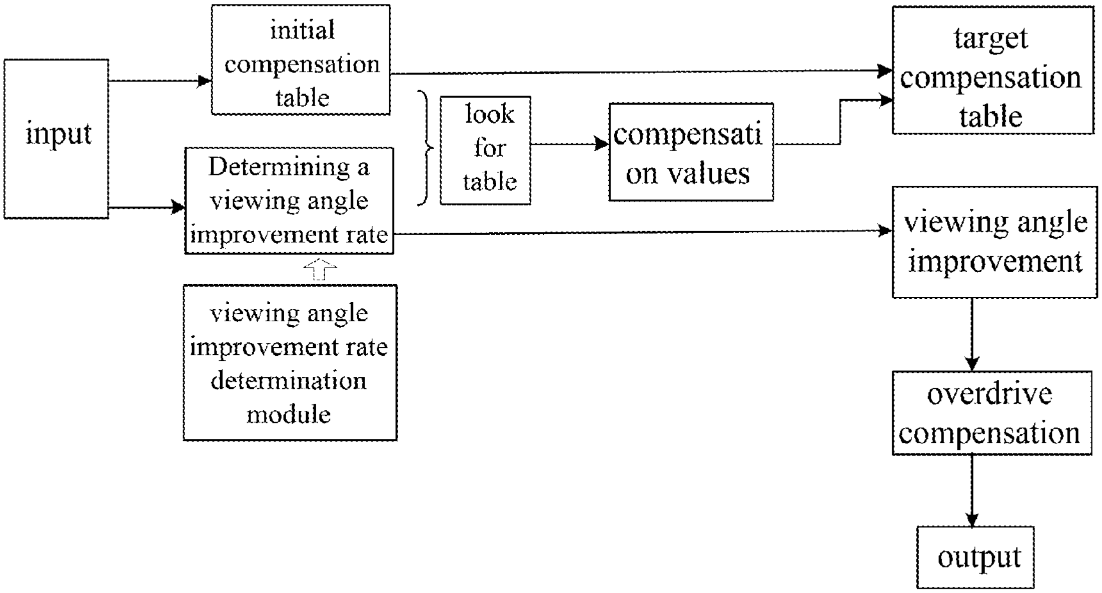
FIG. 9 is a schematic diagram of a second path of compensation for data of the display panel according to another embodiment of the present disclosure.

Please refer to FIG. 9, FIG. 9 is a schematic diagram of a second path of compensation for data of the display panel according to an embodiment of the present disclosure. As shown in FIG. 9, when the display data of the image to be displayed are input into the time control register, the time control register can determine the viewing angle improvement rate through the viewing angle improvement rate determination module. Then, based on the viewing angle improvement rate, the compensation values are obtained by looking up the table. Next, the compensation values are added to the initial compensation table to obtain the target compensation table for white balance compensation of the display data.

Then, based on the viewing angle improvement rate, the viewing angle improvement algorithm is used to improve the viewing angle of the display data after the white balance compensation. Next, overdrive compensation is performed for the display data after the viewing angle has been improved. Since the switching of the viewing angle improvement rate does not affect the overdrive compensation, no additional processing is required for the compensation table of the overdrive compensation. Finally, the display data that have been compensated by a series of algorithms will be output.

Figure 10:
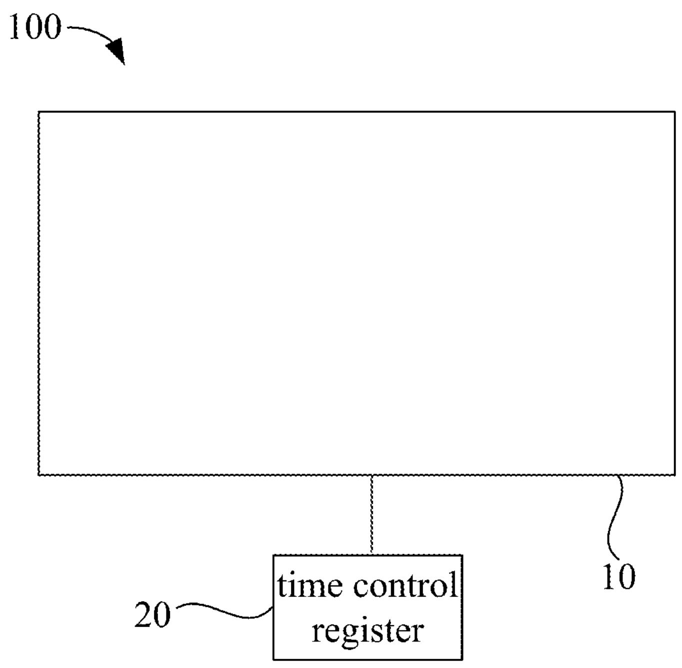
FIG. 10 is a schematic block diagram of a display device according to an embodiment of the present disclosure.

In addition, please refer to FIG. 10, the present disclosure also provides a display device 100. The display device 100 includes a display panel 10 and a time control register 20. The display device 100 compensates for display data of the display panel 10 adopting the method of compensating for data of the display panel described in any of the above embodiments. The time control register 20 is connected to the display panel 10. The time control register 20 is configured to obtain the display data and execute the method of compensating for data of the display panel as mentioned above.

The display device 100 according to one or more embodiments of the present disclosure includes the display panel 10 and the time control register 20. When the display device 100 adopts the preset compensation algorithm to compensate for the display panel 10, different target compensation tables can be obtained based on different viewing angle improvement rates, avoiding incorrect corresponding gray-scales between the viewing angle improvement algorithm and the preset compensation algorithm. Therefore, when the viewing angle improvement rate is switched, the debugging effect of image quality improvement is automatically compensated for so as to maintain good image quality.

The methods of compensating for data of a display panel and display devices according to some embodiments of the present disclosure have been described above in detail. Those skilled in the art may make various modifications based on the present disclosure. Thus, the description should not be construed as limitations to the present disclosure.

What is claimed is:

1. A method of compensating for data of a display panel, comprising:

obtaining display data of an image to be displayed on the display panel;

determining a viewing angle improvement rate for improving a viewing angle of the display panel based on the display data;

setting a plurality of preset viewing angle improvement rates and a plurality of target compensation tables respectively corresponding to the plurality of preset viewing angle improvement rates;

for each of the preset viewing angle improvement rates, obtaining one or more compensation values for compensating the display panel by a preset compensation algorithm based on the each of the preset viewing angle improvement rates, and writing the compensation values into one of the target compensation tables corresponding to the each of the preset viewing angle improvement rates; wherein each of the target compensation tables has a designated location and a designated transmission path;

determining one of the preset viewing angle improvement rates corresponding to the viewing angle improvement rate;

transmitting the display data to the designated position according to the designated transmission path based on the one of the preset viewing angle improvement rates, to obtain the target compensation table; and compensating for the display data based on the target compensation table.

2. The method according to claim 1, wherein the determining of the viewing angle improvement rate comprises:

determining an area of the image to be displayed that requires viewing angle improvement, based on a display color of the image to be displayed, a display type of the image to be displayed, and display gray-scales of the image to be displayed; and determining the viewing angle improvement rate based on the area and the display data.

3. The method according to claim 1, wherein the determining of one of the preset viewing angle improvement rates comprises:

in response to determining that the viewing angle improvement rate is different from each of the preset viewing angle improvement rates, selecting one of the preset viewing angle improvement rates with a minimum difference from the viewing angle improvement rate.

4. The method according to claim 1, wherein the compensation tables are all stored in a memory; and the obtaining of the target compensation table comprises:

determining one or more of the preset viewing angle improvement rates corresponding to the viewing angle improvement rate; and calling one or more of the compensation tables respectively corresponding to the one or more of the preset viewing angle improvement rates from the memory to obtain the target compensation table.

5. The method according to claim 4, wherein the determining of one or more of the preset viewing angle improvement rates comprises:

in response to determining that the viewing angle improvement rate is different from each of the preset viewing angle improvement rates, selecting two of the preset viewing angle improvement rates approximate to the viewing angle improvement rate; and the calling of one or more of the compensation tables to obtain the target compensation table comprises:

performing interpolation processing on two of the compensation tables respectively corresponding to the selected two of the preset viewing angle improvement rates, to obtain the target compensation table.

6. The method according to claim 1, further comprising: before obtaining the target compensation table, setting a first preset viewing angle improvement rate of 100%, and obtaining an initial compensation table corresponding to the preset compensation algorithm based on the first preset viewing angle improvement rate;

adjusting the first preset viewing angle improvement rate to obtain different preset viewing angle improvement rates, and obtaining a plurality of viewing angle compensation tables respectively corresponding to the different preset viewing angle improvement rates;

obtaining compensation tables respectively corresponding to the different preset viewing angle improvement rates for the preset compensation algorithm, based on the viewing angle compensation tables; and obtaining a plurality of compensation values respectively corresponding to the first preset viewing angle improvement rate and the different preset viewing angle improvement rates for the preset compensation algorithm, based on the initial compensation table and the compensation tables.

7. The method according to claim 6, wherein the obtaining of the target compensation table comprises:

obtaining one preset viewing angle improvement value of the first preset viewing angle improvement value and the different preset viewing angle improvement rates corresponding to the viewing angle improvement rate;

determining one of the compensation values corresponding to the one preset viewing angle improvement value; and superimposing the one of the compensation values with the initial compensation table to obtain the target compensation table.

8. The method according to claim 1, further comprising:

before or after compensating for the display data based on the target compensation table, improving the viewing angle of the display panel by using a viewing angle improvement algorithm based on the viewing angle improvement rate.

9. The method according to claim 1, wherein the preset compensation algorithm is a white balance adjustment algorithm, a brightness compensation algorithm, or a gamma adjustment algorithm.

10. A display device, comprising a display panel and a time control register connected to the display panel, wherein the time control register is configured to performing operations comprising:

obtaining display data of an image to be displayed on the display panel;

determining a viewing angle improvement rate for improving a viewing angle of the display panel based on the display data;

setting a plurality of preset viewing angle improvement rates and a plurality of target compensation tables respectively corresponding to the plurality of preset viewing angle improvement rates;

for each of the preset viewing angle improvement rates, obtaining one or more compensation values for compensating the display panel by a preset compensation algorithm based on the each of the preset viewing angle improvement rates, and writing the compensation values into one of the target compensation tables corresponding to the each of the preset viewing angle improvement rates; wherein each of the target compensation tables has a designated location and a designated transmission path;

determining one of the preset viewing angle improvement rates corresponding to the viewing angle improvement rate;

transmitting the display data to the designated position according to the designated transmission path based on the one of the preset viewing angle improvement rates, to obtain the target compensation table; and compensating for the display data based on the target compensation table.

11. The display device according to claim 10, wherein the determining of the viewing angle improvement rate comprises:

determining an area of the image to be displayed that requires viewing angle improvement, based on a display color of the image to be displayed, a display type of the image to be displayed, and display gray-scales of the image to be displayed;

determining the viewing angle improvement rate based on the area and the display data.

12. The display device according to claim 10, wherein the determining of one of the preset viewing angle improvement rates comprises:

in response to determining that the viewing angle improvement rate is different from each of the preset viewing angle improvement rates, selecting one of the preset viewing angle improvement rates with a minimum difference from the viewing angle improvement rate.

13. The display device according to claim 10, wherein the compensation tables are all stored in a memory; and the obtaining of the target compensation table comprises:

determining one or more of the preset viewing angle improvement rates corresponding to the viewing angle improvement rate; and calling one or more of the compensation tables respectively corresponding to the one or more of the preset viewing angle improvement rates from the memory to obtain the target compensation table.

14. The display device according to claim 13, wherein the determining of one or more of the preset viewing angle improvement rates comprises:

in response to determining that the viewing angle improvement rate is different from each of the preset viewing angle improvement rates, selecting two of the preset viewing angle improvement rates approximate to the viewing angle improvement rate; and the calling of one or more of the compensation tables to obtain the target compensation table comprises:

performing interpolation processing on two of the compensation tables respectively corresponding to the selected two of the preset viewing angle improvement rates, to obtain the target compensation table.

15. The display device according to claim 10, wherein the preset compensation algorithm is a white balance adjustment algorithm, a brightness compensation algorithm, or a gamma adjustment algorithm.

16. The display device according to claim 10, wherein the operations further comprise: before obtaining the target compensation table, setting a first preset viewing angle improvement rate of 100%, and obtaining an initial compensation table corresponding to the preset compensation algorithm based on the first preset viewing angle improvement rate;

adjusting the first preset viewing angle improvement rate to obtain different preset viewing angle improvement rates, and obtaining a plurality of viewing angle compensation tables respectively corresponding to the different preset viewing angle improvement rates;

obtaining compensation tables respectively corresponding to the different preset viewing angle improvement rates for the preset compensation algorithm, based on the viewing angle compensation tables; and obtaining a plurality of compensation values respectively corresponding to the first preset viewing angle improvement rate and the different preset viewing angle improvement rates for the preset compensation algorithm, based on the initial compensation table and the compensation tables.

17. The display device according to claim 16, wherein the obtaining of the target compensation table comprises:

obtaining one preset viewing angle improvement value of the first preset viewing angle improvement value and the different preset viewing angle improvement rates corresponding to the viewing angle improvement rate;

determining one of the compensation values corresponding to the one preset viewing angle improvement value; and superimposing the one of the compensation values with the initial compensation table to obtain the target compensation table.

18. The display device according to claim 10, the operations further comprise:

before or after compensating for the display data based on the target compensation table, improving the viewing angle of the display panel by using a viewing angle improvement algorithm based on the viewing angle improvement rate.

19. A method of compensating for data of a display panel, comprising:

obtaining display data of an image to be displayed on the display panel;

determining a viewing angle improvement rate for improving a viewing angle of the display panel based on the display data;

setting a first preset viewing angle improvement rate of 100%, and obtaining an initial compensation table corresponding to a preset compensation algorithm based on the first preset viewing angle improvement rate;

adjusting the first preset viewing angle improvement rate to obtain different preset viewing angle improvement rates, and obtaining a plurality of viewing angle compensation tables respectively corresponding to the different preset viewing angle improvement rates;

obtaining compensation tables respectively corresponding to the different preset viewing angle improvement rates for the preset compensation algorithm, based on the viewing angle compensation tables;

obtaining a plurality of compensation values respectively corresponding to the first preset viewing angle improvement rate and the different preset viewing angle improvement rates for the preset compensation algorithm, based on the initial compensation table and the compensation tables;

obtaining a target compensation table for compensating the display panel by the preset compensation algorithm based on the viewing angle improvement rate; and compensating for the display data based on the target compensation table.

* * * * *